United States Patent
Rusitoru et al.

(10) Patent No.: US 11,550,585 B2
(45) Date of Patent: Jan. 10, 2023

(54) ACCELERATOR INTERFACE MECHANISM FOR DATA PROCESSING SYSTEM

(71) Applicant: Arm Limited, Cambridge (GB)

(72) Inventors: Roxana Rusitoru, Cambridge (GB); Jonathan Curtis Beard, Austin, TX (US); Alexander Sebastian Bischoff, Cambridge (GB)

(73) Assignee: Arm Limited, Cambridge (GB)

(*) Notice: Subject to any disclaimer, the term of this patent is extended or adjusted under 35 U.S.C. 154(b) by 85 days.

(21) Appl. No.: 17/209,606

(22) Filed: Mar. 23, 2021

(65) Prior Publication Data

US 2022/0308879 A1   Sep. 29, 2022

(51) Int. Cl.
*G06F 9/34* (2018.01)
*G06F 12/10* (2016.01)
*G06F 9/30* (2018.01)

(52) U.S. Cl.
CPC ........... *G06F 9/34* (2013.01); *G06F 9/30145* (2013.01); *G06F 12/10* (2013.01)

(58) Field of Classification Search
CPC ......... G06F 12/10; G06F 9/30145; G06F 9/34
See application file for complete search history.

(56) References Cited

U.S. PATENT DOCUMENTS

| | | | |
|---|---|---|---|
| 2008/0222383 A1 | 9/2008 | Spracklen et al. | |
| 2017/0102892 A1 | 4/2017 | Pusukuri et al. | |
| 2020/0097216 A1* | 3/2020 | Marcu | G06F 3/0659 |
| 2020/0293365 A1* | 9/2020 | Cooray | G06T 1/60 |
| 2020/0310993 A1* | 10/2020 | Kumar | G06F 3/0604 |
| 2020/0364088 A1* | 11/2020 | Ashwathnarayan | G06F 9/5016 |

* cited by examiner

*Primary Examiner* — Zachary K Huson
(74) *Attorney, Agent, or Firm* — Leveque Intellectual Property Law, P.C.

(57) ABSTRACT

A method and apparatus is provided for processing accelerator instructions in a data processing apparatus, where a block of one or more accelerator instructions is executable on a host processor or on an accelerator device. For an instruction executed on the host processor and referencing a first virtual address, the instruction is issued to an instruction queue of the host processor and executed the instruction by the host processor, the executing including translating, by translation hardware of the host processor, the first virtual address to a first physical address. For an instruction executed on the accelerator device and referencing the first virtual address, the first virtual address is translated, by the translation hardware, to a second physical address and the instruction is sent to the accelerator device referencing the second physical address. An accelerator task may be initiated by writing configuration data to an accelerator job queue.

23 Claims, 10 Drawing Sheets

ACCELERATOR INTERFACE MECHANISM FOR DATA PROCESSING SYSTEM

BACKGROUND

A data processing system may include number of general-purpose processing cores and one or more accelerators. An accelerator is a hardware module designed to perform one or more specific tasks with increased speed or efficiency. Example accelerators include a graphics processing unit (GPU), an array processor, a cryptographic engine, a neural network engine and a digital signal processor (DSP). An accelerator may be shared between multiple processors, with each processor off-loading tasks to the accelerator. Further, a data processing system may include multiple accelerators. There exists a need to provide an interface between the general-purpose processing cores and the accelerator.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding or analogous elements.

DETAILED DESCRIPTION

Figure 1:
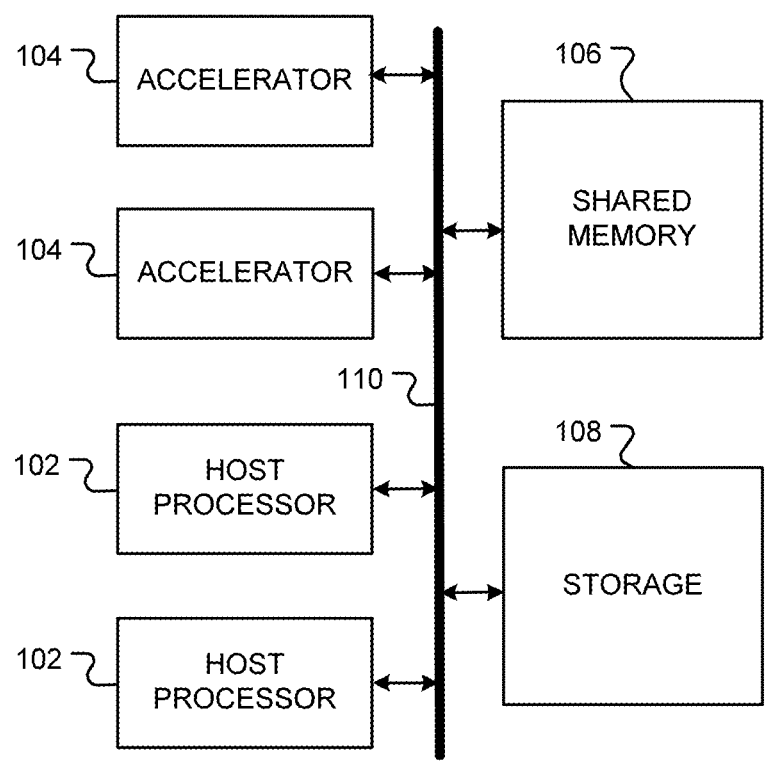
FIG. 1 is a simplified block diagram of a data processing system in accordance with various representative embodiments.

The various apparatus and devices described herein provide mechanisms for off-loading processing tasks from a host processor to an accelerator.

While this present disclosure is susceptible of embodiment in many different forms, specific embodiments are shown in the drawings and will herein be described in detail. It is to be understood that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

The present disclosure provides a data processing system with a mechanism for attaching accelerators anywhere within a physical address space, using process-specific address spaces, and actuating them from a host processor of the data processing system in an out-of-order fashion. The host processor is used for address translation and control flow. The accelerators can be used by multiple processors.

The mechanism enables memory-atomic, asynchronous execution of accelerator tasks that are dispatched from the host-processor. The accelerators may be located anywhere within the host-addressable memory fabric. The host processor may be, for example, a processor core that provides out-of-order execution of instructions. In this case, the host processor can continue executing instructions out-of-order until dependent on the accelerator output. The accelerator is configured to use an input/output, task-based model and all address translation is handled by the originating host processor. This methodology supports an arbitrary number of accelerators. In addition, dispatch of a task to any accelerator can take place from any host processor within the addressable memory fabric. The accelerator receives configuration data from the host processor, including addresses for input and output data buffers and an instruction block. The accelerator may have mechanisms for isolating memory regions of one job from memory regions of other jobs. These mechanisms could include a mechanism to reset the memory to zero, an "xor" key, or any other number of known methods.

Data used by the accelerator is kept within the virtual address space of the host process or processing thread that is making use of it. This ensures exclusivity of use by the accelerator when non-shared pages are allocated. Input and output data buffers are created on the host side, enabling virtual to physical address translation to be performed by the host processor. The accelerator is configured to write to a physical address provided by the host.

The use of an input/output model by the accelerator means that the accelerator output is the only data dependency for the process. As a result, the only instructions that need to be tracked in the reorder buffer of the host processor are loads to the accelerator output buffer. Thus, non-dependent instructions can be executed in parallel by the host processor.

The disclosed mechanism enables a process to dispatch a job and then wait, asynchronously, for the result—thereby allowing for continued execution.

Accelerator memory visibility operates in an atomic way with respect to the rest of the addressable memory space of the data processing system. The granularity of atomicity can be adjusted, transparently to the programming model, by adjusting the size of the window over which the accelerator's physical address space is mapped into the host processes virtual space.

The disclosed mechanism provides a simplified model for sharing an accelerator between host cores and processes. Job configuration data is pushed onto the accelerator job queue with some priority, e.g., in a first-come, first-served manner (although some other policy may be used for prioritization), by any process running on any core. A system-wide memory-mapped address is provided for the job queue, which can then be mapped into specific process address spaces (it can be shared by multiple guest operating systems and processes). Job configuration data is written to the queue atomically, so that one entry is one job, and that one job is received atomically by the target. The job configuration data may include an identifier to indicate the host's address space (e.g., information to uniquely identify an address space by the accelerator), a host identifier (this could be a central processing unit core identifier, a port address on a common bus, etc.), addresses for input and output buffers (which could be relative to the provided address space) and an address for an instruction queue (which also could be relative to the provided address space).

Primary translation from virtual address to physical address (or intermediate physical address) for each memory accessing instruction is performed on the host processor and needs to only be performed once—during hand-off to accelerator, for example. This ensures that faults are detected at the host processor rather than at the accelerator. The accelerator, in turn, processes so called pseudo-operations. A load on the host core to virtual address X, which translates to physical (or intermediate physical) address Y, is in turn issued as a pseudo-load to physical address Y from the accelerator. Likewise a store on the host core to virtual address J, which translates to physical (or intermediate physical) address K, is in turn issued as a pseudo-store to physical address K from the accelerator.

The architectural, or micro-architectural, mechanism is stable across multiple accelerator types, allowing any number of accelerators to be supported using the same mechanism. The mechanism provides a single instruction set architecture (ISA) and application programming interface/ (API) that can be used for multiple accelerator types.

FIG. 1 is a simplified block diagram of a data processing system 100 in accordance with various representative embodiments. Data processing system 100 includes a number of host processors 102 and one or more accelerators 104. A host processor may be a general-purpose processing core, for example. An accelerator is a specialized hardware module, often designed to be highly efficient at performing one or more particular tasks. Example accelerators include a graphics processing unit (GPU), an array processor, a cryptographic engine, a neural network engine and a digital signal processor (DSP). An accelerator may be shared between multiple processors, so there is a need to provide an interface between the general-purpose processors and the accelerator. Data processing system 100 also includes one or more shared memories 106, such as random access memory, and storage device 108, such as a solid state drive, hard disc or other non-volatile storage. The elements of data processing system 100 are connected via an interconnect 110, which may be a coherent interconnect, a network, or bus, for example.

In accordance with embodiments of the disclosure, a host processor 102 of data processing system 100 executes a program of instructions that includes a block of accelerator instructions. The accelerator instructions specify an accelerator task and may be identified, for example, by a designated bit in the instruction, or by START and STOP instructions at the beginning and end, respectively of the block of accelerator instructions. The accelerator instructions may be executed by an accelerator 104 or by a host processor 102.

Accelerators 104 are configured to use an input/output model, in which data stored in an input buffer is processed according to the accelerator instructions to produce output data. At the end of the processing task, the output buffer contains the output data resulting from the task. The input and output buffers used by an accelerator 104 may be internal to the accelerator or allocated in shared memory 106. At boot time, internal accelerator buffers may be memory-mapped to memory addresses or external accelerator buffers may be allocated in the shared memory.

An embodiment of the disclosure provides method for executing a program of instructions for a process in a data processing apparatus, the program of instructions including host instructions for execution on a host processor of the data processing apparatus and a block of one or more accelerator instructions for a processing task executable on the host processor or an accelerator device of the data processing apparatus. For an instruction executed on the host processor and referencing a first virtual address of the process, the instruction is issued to an instruction queue of the host processor, the instruction referencing the first virtual address, and is executed by the host processor. Execution of the instruction includes translating, by translation hardware of the host processor, the first virtual address to a first physical address. However, for an instruction executed on the accelerator device and referencing the first virtual address, the first virtual address is translated to a second physical address by the translation hardware of the host processor before the instruction is sent to the accelerator device. In contrast to an instruction executed by the host, the instruction sent to the accelerator references the second physical address.

Figure 2:
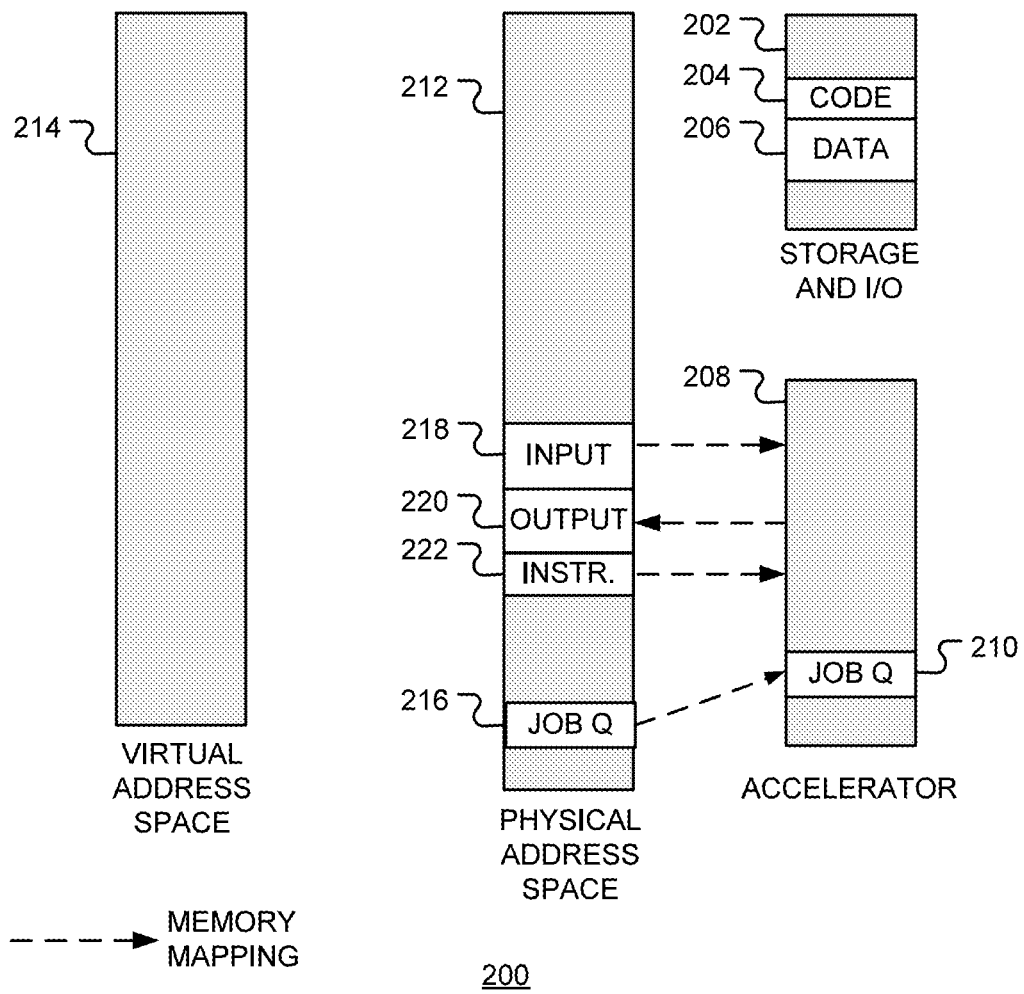
FIGS. 2-8 are diagrammatic representations of memory content and mappings in a data processing system, in accordance with various representative embodiments.

FIG. 2 is a diagrammatic representation of the state 200 of memory in a data processing system, in accordance with various representative embodiments. FIG. 2 shows memory content and memory mappings after a data processing system is booted. Memory 202 is storage class memory, such as flash memory, hard disc storage or other non-volatile storage. Storage class memory 202 contains code 204 and may also contain data 206. Code 204 includes an executable program of instructions that, in turn, includes a block of accelerator instructions. Accelerator 208 includes storage for accelerator job queue 210, discussed in more detail below.

Physical address space 212 is an address space used by the hardware to direct signals. The physical address space may be associated with one or more random access memories and a number of memory mapped hardware elements.

Virtual address space 214 is a logical address space that is used by software as an intermediate address space for accessing the physical hardware. In operation, a memory management unit, or equivalent, translates virtual addresses to physical addresses. In this way the software may be written without detailed knowledge of the hardware on which it will be executed.

When the data processing system is booted, a kernel or operating system maps the accelerator job queue 210 to a job queue address 216 in the physical address space, assuming that job queue is internal to the accelerator. If the job queue is not internal to the accelerator, the job queue is allocated in memory.

Also at boot time, the kernel or operating system allocates space in the memory for an accelerator input buffer 218, an accelerator output buffer 220 and, optionally, an accelerator instruction queue 222. In a further embodiment, accelerator instruction queue 222 is internal to the accelerator and is memory-mapped to a base and range within of addresses in the physical or intermediate-physical address space. The size of the buffers may be determined from a list of accelerators and their properties.

In FIG. 2, the broken-line arrows indicate memory mappings.

Figure 3:
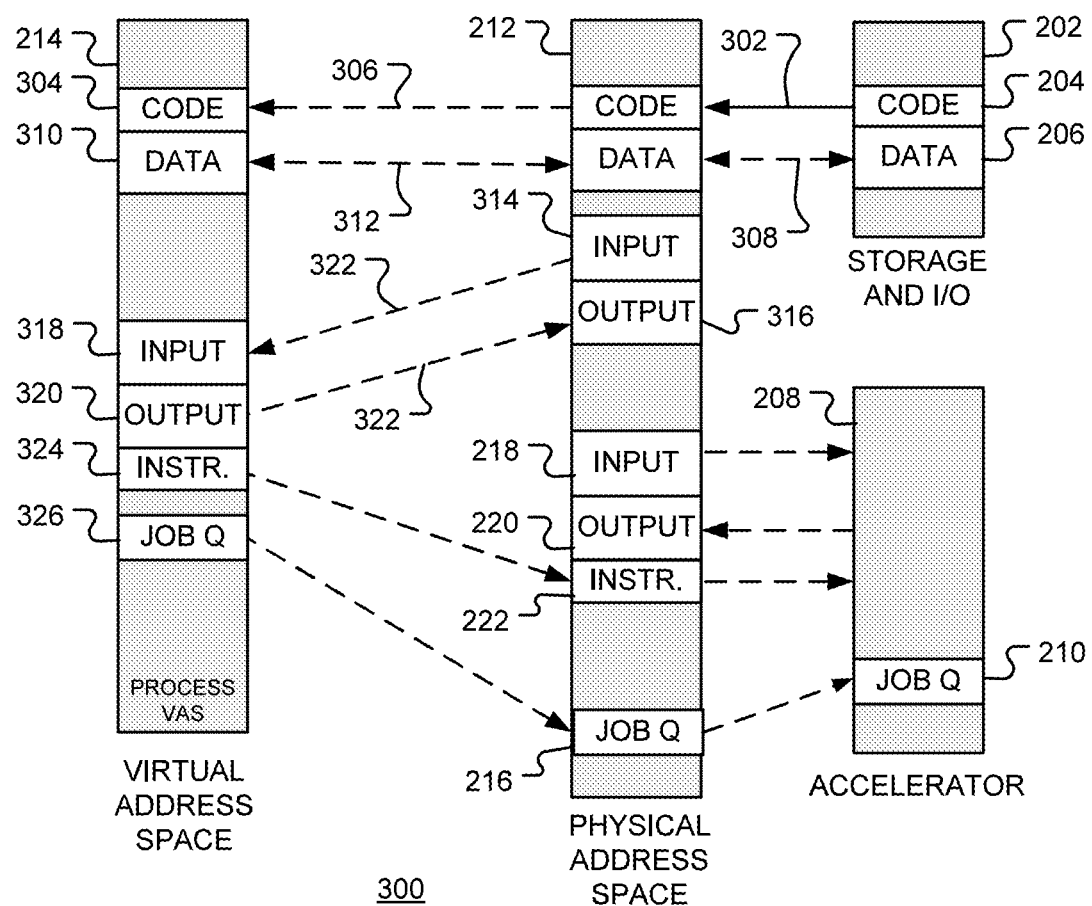

FIG. 3 is a diagrammatic representation of the state 300 of memory in a data processing system, in accordance with various representative embodiments. FIG. 3 shows memory content and memory mappings after a process has been initiated on a host processor. When an executable program is initiated, an operating system or kernel loads the coded instructions are into memory region 302 in the physical address space. A region 304 of virtual address space 214 is assigned for the code, as depicted by mapping 306. Optionally, data 206 is loaded in physical memory, as depicted by mapping 308 and mapped to virtual address region 310, as indicated by mapping 312. When the process is initiated, or when a block of accelerator instructions is detected, input buffer 314 and output buffer 316 are allocated in physical memory and mapped to virtual address regions 318 and 320, respectively, as indicated by mappings 322. This may be done by a device driver, for example, based on the requirements of the accelerator. The address of instruction buffer 222 is mapped to a virtual 324 and the address 216 of accelerator job queue 210 is mapped to virtual address 326.

The virtual addresses are all in a region of virtual address space reserved exclusively for the process being executed on the host processor and unique to this process.

Thus, the input and output buffers visible to the process are mapped to buffers 314 and 316 in physical memory 212. As discussed above, a memory management unit (MMU) may be used to translate virtual addresses in the virtual address space to physical addresses in the memory, or other hardware. The MMU may use a page table or range table, for example. Address translations may be sped up using a translation look-aside buffer (TLB).

Figure 4:
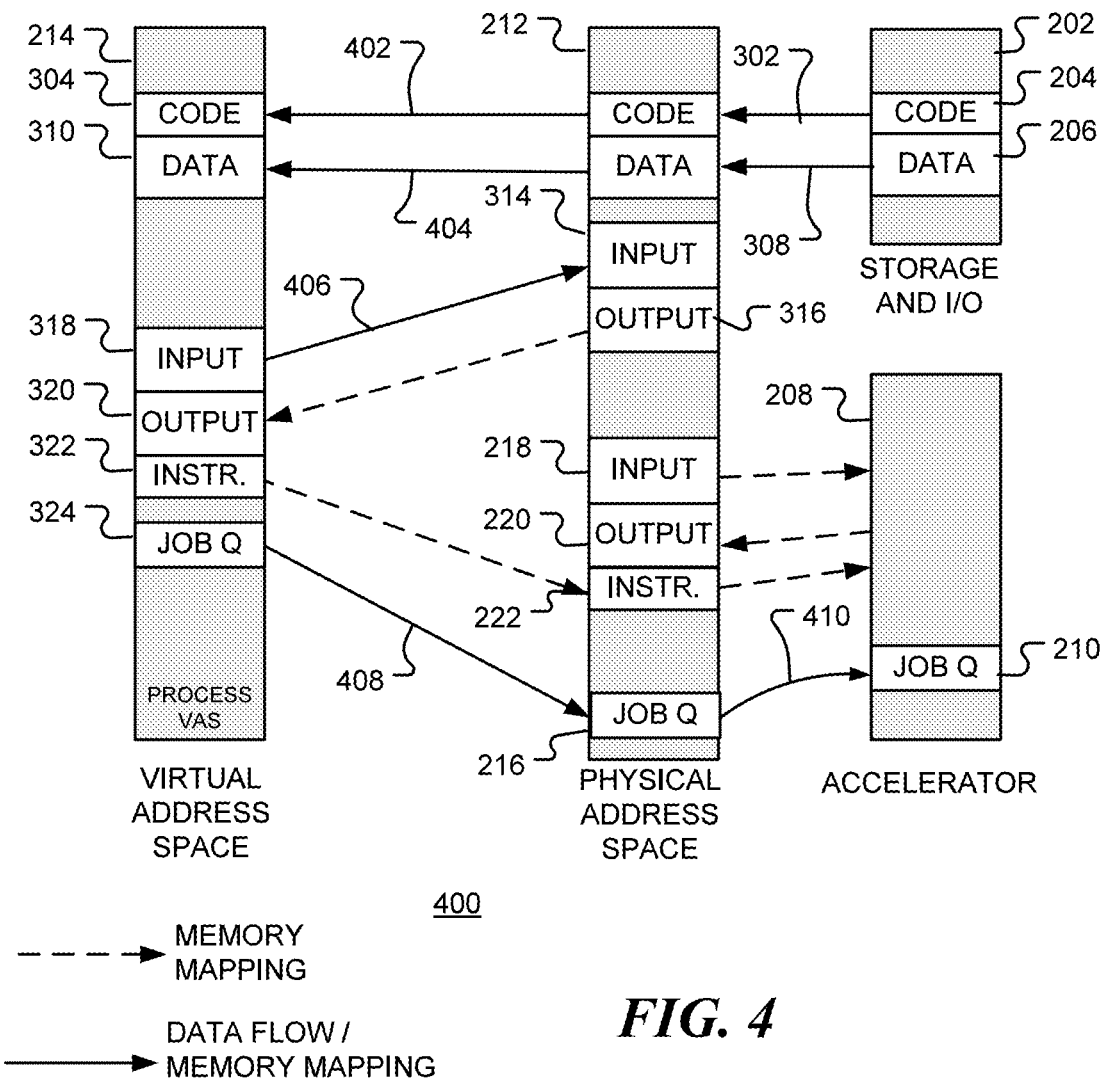

FIG. 4 is a diagrammatic representation of the state 400 of memory in a data processing system, in accordance with various representative embodiments. FIG. 4 shows memory content and memory mappings when a processing task is submitted to the accelerator. In FIG. 4, solid-line arrows indicate data flow and broken-line arrows indicate address mappings. During execution of the process, code and data in memory 212 are accessed using the virtual address space as indicated by arrows 402 and 404, respectively. Instructions are moved from the memory to an instruction cache, from where they are fetched and decoded by the host processor. Data to be processed by an accelerator may be pre-loaded into input buffer 314, as indicated by arrow 406. When the start of a block of accelerator instructions is fetched and decoded, the host processor selects a suitable accelerator for the processing task to be off-loaded to. Selection may be based on metadata in the accelerator instructions, for example. The host processor then stores configuration data to the accelerator job queue of the selected accelerator, using the virtual address of the job queue, as indicated by arrow 408. The configuration data is stored in the job queue 210 of the accelerator, as indicated by arrow 410. The configuration data may be stored using a conditional store operation so that any fault is detected by the host processor. The configuration data identifies physical addresses in the memory of the input buffer 314 and output buffer 316 of the process and serves as a request for access to the accelerator. In one embodiment, the configuration data includes an identifier of the process address space (PAS).

Other processes may also store configuration data to the accelerator job queue. When the accelerator reads configuration data for a processing task of a process, it copies data from the input buffer of that process (using the physical address given in the configuration data), resets the context of the accelerator and then signals the host processor that it is ready to process accelerator instructions.

Figure 5:
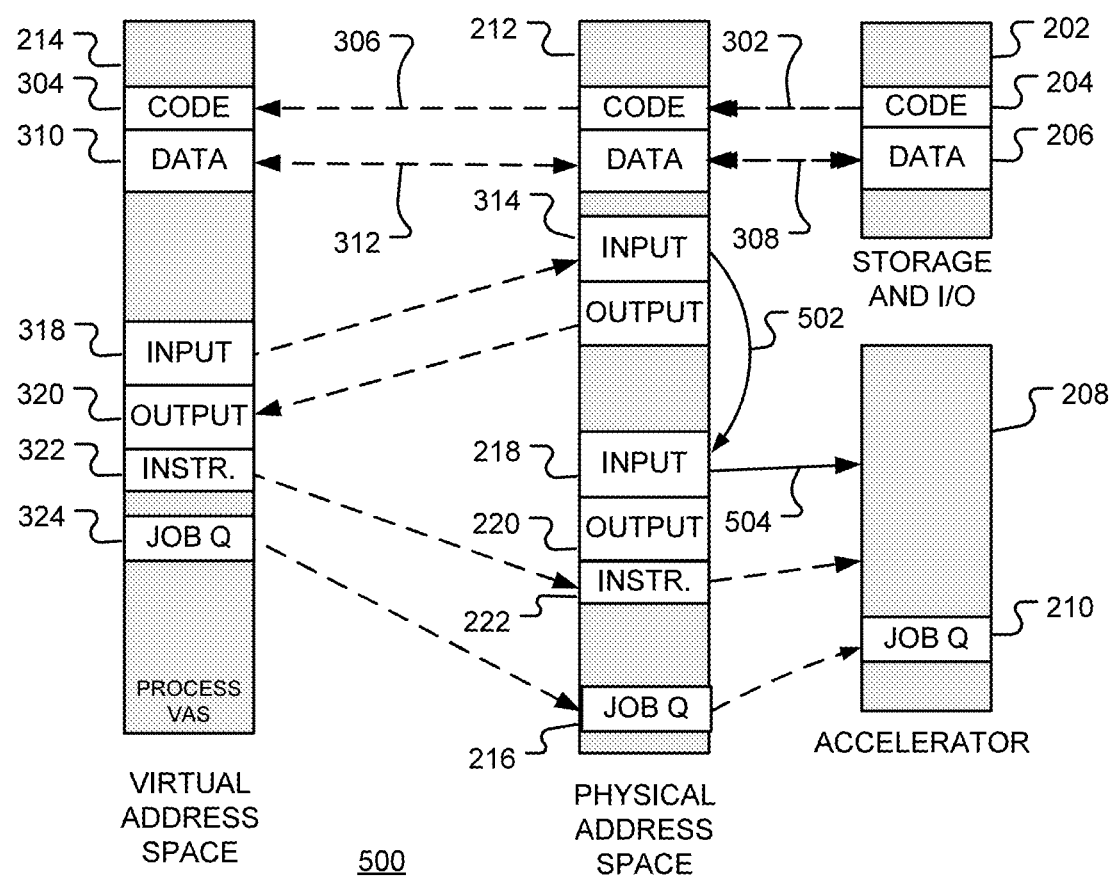

FIG. 5 is a diagrammatic representation of the state 500 of memory in a data processing system, in accordance with various representative embodiments. FIG. 5 shows memory content and memory mappings when the accelerator is configured to perform a processing task. The accelerator accesses information for the processing task from the accelerator job queue 210. Information in the queue identifies, directly or indirectly, the memory locations of the process input buffer 314 and the process output buffer in the memory. Any data pre-loaded into input buffer 314 is copied into the accelerator input buffer 218, as indicated by arrow 502, where it can be accessed by the accelerator, as indicated by arrow 504. In a further embodiment, the accelerator may operate directly on data in input buffer 314. The virtual addresses of the input buffer 314 and output buffer 316 of the process are then re-mapped to the physical addresses of the accelerator input buffer 218 and output buffer 220. The remapping is performed in hardware. In one embodiment, the core of the host processor itself has a "remap" register that may be used to set an overlay for specific virtual address ranges. The newly remapped physical space has the same size as the original space, however, the alignment may differ. The host already has "access" to the accelerator/device and therefore a second level of permissions checks by the operating system are not needed. Copying of the input data from the input buffer of the process to the input buffer of the accelerator may be performed in hardware by a memory manager.

The process is now attached to the accelerator. From the viewpoint of the process, the input and output buffers remain unchanged, and are at the same virtual addresses. This action may be viewed as a memory overlay in the virtual memory space. The accelerator signals the host processor when the setup is complete.

Figure 6:
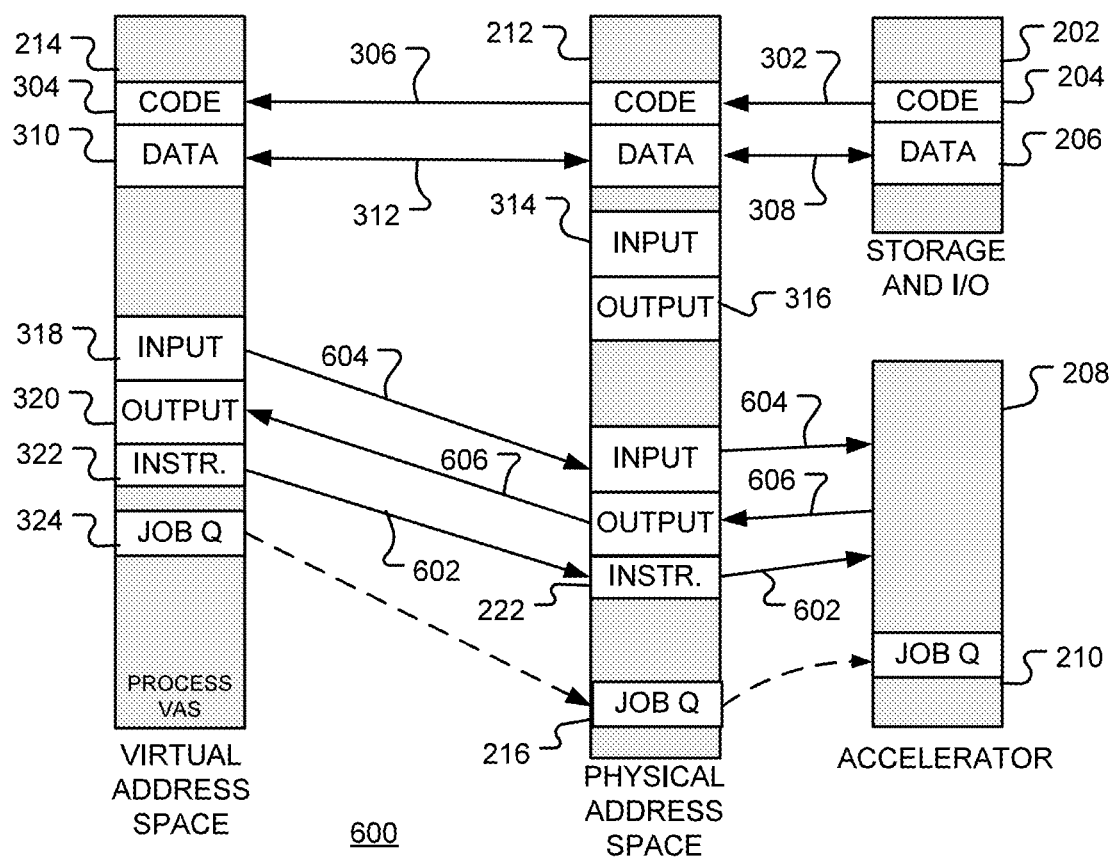

FIG. 6 is a diagrammatic representation of the state 600 of memory in a data processing system, in accordance with various representative embodiments. FIG. 6 shows memory content and memory mappings when the accelerator is performing a processing task off-loaded from the host processor. Once the host processor receives the signal from the accelerator the process is bound to the accelerator and can start streaming instructions to the accelerator. The host processor streams instructions of the block of accelerator instructions to the accelerator by writing them to instruction queue 222. This may be done using a pseudo-load/store instruction on the host, in which the virtual address of a buffer loaded to translate the virtual address to a physical address and then an instruction is issued to the accelerator to store data to the physical address. This may be done for accelerator instructions, as indicated by arrows 602, and for input data, as indicated by arrow 604. In this example, instructions via a memory-mapped instruction buffer. A virtual address of the instruction buffer may be provided when the process is initialized. However, the instructions may be sent by other means, such as a designated communication channel or via a memory-mapped instruction buffer. In a still further embodiment, instructions may be pre-loaded, at some granularity (e.g., in blocks), into an instruction buffer allocated to the process, the address of which is included in the configuration data.

TABLE 1

| Host processor instruction | Accelerator instruction |
| --- | --- |
| load value at VA(var1) into reg1 | load value at PA(var1) into reg1 |
| load value at VA(var2) into reg2 | load value at PA(var2) into reg2 |
| reg3 = reg1 * reg2 | reg3 = reg1 * reg2 |
| store value in reg3 to VA(output) | store value in reg3 to PA(output) |

In an ordinary process pipeline, for a load operation by the host core to a given virtual address X or a load operation "load r1, [X]" to fill a register r1, the virtual address of X is translated in the host and a physically addressed load instruction is issued to the memory bus. For a tightly coupled accelerator, the mapping from virtual address to physical address is handled by the host. To accomplish this, a pseudo-load operation is used rather than a load to a register in the ordinary sense. For a given load operation within the accelerator region of code, a pseudo-load instruction, "pseudo-load r1, [X]" for the virtual address X is issued on the host. As a result, the virtual address for "X" is translated to a physical address on the host. A follow-on load instruction "load r1, [X-PA]", in the accelerator instruction stream and within the same program order, is issued within the accelerator. The issue is coordinated by the host. The "load r1, [X-PA]" instruction references the corresponding physical address X-PA and the data is loaded into the accelerator version of register "r1". A corresponding store operation is also performed such that a "store [X], r1" instruction results in a pseudo-store operation that would translate "X" and store the accelerator register value "r1" to the physical address X-PA.

The accelerator processes input data from the accelerator input buffer using the accelerator instructions passed from the host processor. The results are stored in the output buffer of the accelerator and, optionally, may be read by the host processor, as indicated by arrows 606.

Figure 7:
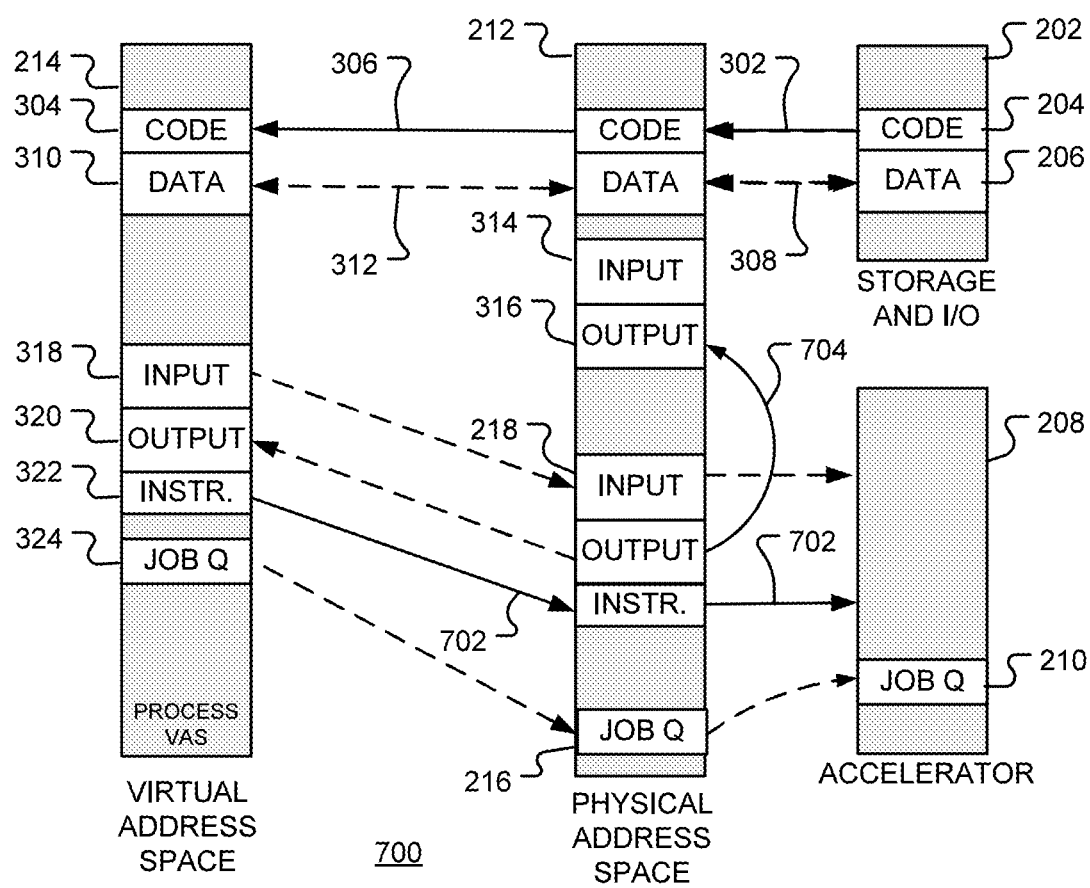

FIG. 7 is a diagrammatic representation of the state 700 of memory in a data processing system, in accordance with various representative embodiments. FIG. 7 shows memory content and memory mappings at the end of the processing task off-loaded to the accelerator. When the host processor fetches and decodes the last accelerator instruction of the block of accelerator instructions, it signals the accelerator. This may be done, for example, by writing to the instruction queue, as indicated by arrow 702 or to control region of the accelerator. When all of the instructions have been processed by the accelerator, the output data is copied from the accelerator output buffer to the output buffer of the process, as indicated by arrow 704. This copy may be performed in hardware or software. The accelerator then signals that the task is complete. The virtual addresses of the input and output buffers, 318 and 320, are then re-mapped to the input and output buffers, 314 and 316 respectively, of the process. The remapping may be performed by the operating system and/or the memory management unit. Once this remapping is complete, the core is configured to ensure that the virtual addresses now point to the original host resident mappings indicated by 314 and 316, respectively. This is shown in FIG. 8.

The output data is then in the virtual address space of the process, and the accelerator can move on to the next task in the job queue.

Figure 8:
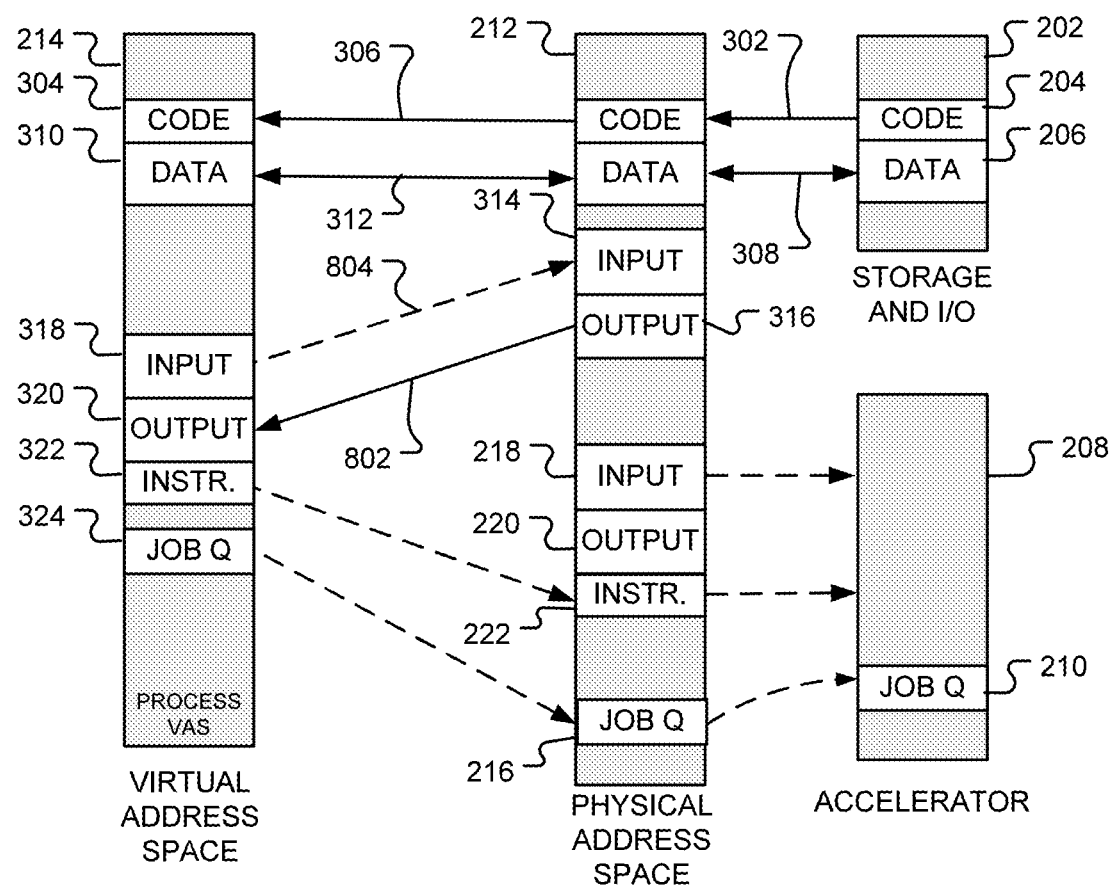

FIG. 8 is a diagrammatic representation of the state 800 of memory in a data processing system, in accordance with various representative embodiments. FIG. 8 shows memory content and memory mappings after completion of the processing task by the accelerator. As described above, virtual output buffer 320 is mapped to physical output buffer 316, as indicated by arrow 802, and virtual input buffer 318 is mapped to physical input buffer 314, as indicated by arrow 804. The host processor can then continue to processing normal, non-accelerator, instructions.

Figure 9:
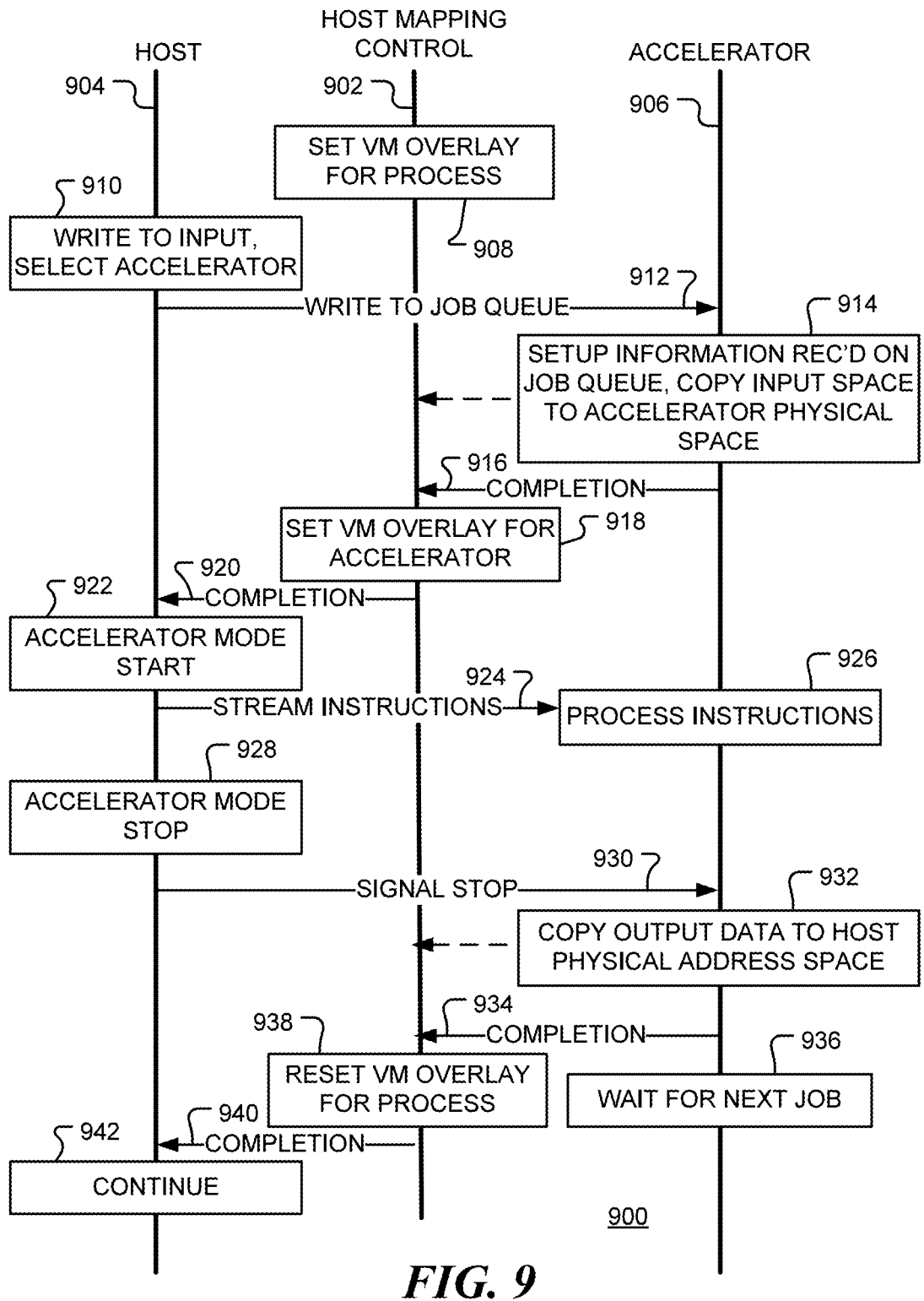
FIG. 9 is a sequence diagram for a method for off-loading a processor task from a host processor to an accelerator, in accordance with various representative embodiments.

FIG. 9 is a sequence diagram 900 for a method for off-loading a processor task from a host processor to an accelerator, in accordance with representative embodiments. FIG. 9 shows timeline 902 for a host mapping function, timeline 904 for a host processor and timeline 906 for an accelerator, with time flowing downwards. When a process is initiated, a virtual memory (VM) overlay is set for the process. This may be done, for example by a device driver when a process is initiated on the host processor or when a block of accelerator instructions is detected. Space is allocated in the physical memory for input and output buffers and mapped to virtual memory in the virtual address region of the process. The buffers are allocated based on accelerator requirements. Virtual addresses are also assigned that map to accelerator job queues and, optionally, accelerator instruction buffers. At block 908, the host processor mapping function sets a virtual memory (VM) overlay for the process. This may include setting values of one or more remap registers for address translation. The initial register values cause virtual addresses to be mapped to physical addresses allocated for the process. At block 910, the host processor begins processing of a block of accelerator instructions for a processing task and selects a suitable accelerator based on the requirements of the block of accelerator instructions. The processing task uses an input/output model in which data in an input buffer is processed and the results written to an output buffer. Data may be pre-loaded to the input buffer of the process at 910. If no suitable accelerator is available, the accelerator instructions may be processed by the host processor using the input and output buffers of the process.

At 912, the host processor writes configuration data to the job queue of the selected accelerator. The configuration data includes, or references, the memory addresses of the input and output buffers of the process. The write operation may be performed using a block-write instruction, such as an atomic 64-byte store to device memory instruction of the instruction set architecture, which atomically stores 64 bytes to region starting at a designated address with conditionality (the conditionality being predicated on the endpoint accepting or rejecting the data). The process then waits for an event, such as a signal, that the job setup has been completed. This signal could occur via interrupt, polling (e.g., continuously reading an address that is pre-specified for a specific value that indicates an event), a direct wire (e.g., '1' or high signal to indicate an event), wait-for-event using an ISA mediated signal, or other such mechanism. The accelerator may process jobs in the job queue in the order in which they were written, or in an arbitrary order (e.g., out of order but program order preserving). Multiple processes or threads can write to the job queue. At 914, the accelerator reads the configuration data from the job queue and sets up the accelerator accordingly. Any data in the input buffer of the process is copied to the input buffer of the accelerator. A hardware mechanism may be used to copy the data, as indicated by the broken arrow from block 914. At 916, the accelerator signals that the accelerator setup has been completed. At 918, the host mapping function sets the virtual memory overlay for the accelerator by mapping the virtual address for the input and output buffers to the physical addresses of the input and output buffers of the accelerator. This may be done, for example, by resetting a remap register value for the translation hardware. Once complete, as indicated by 920, the host process begins streaming instructions to the accelerator at 924. The instructions may be sent via a dedicated channel or via a memory-mapped instruction queue. In the latter case, instructions may be preloaded into an instruction queue of the process, copied into the accelerator instruction queue at 914, and the virtual address of the instruction queue remapped to the accelerator instruction queue at 918. The accelerator receives and processes instructions at 926. At 928, the host processor reaches the end of the block of accelerator instructions and informs the accelerator at 930. This may be done by writing a last instruction (such as a flush or drain command), to the accelerator or by signaling through a control channel. At 932, when the accelerator has processed all the instructions, the results of the processing task are copied from the accelerator output buffer to the output buffer of the process, using the configured information supplied in the job queue. The data may be copied by hardware, by a "page move" operation, for example, as indicated by the broken arrow from 932. At 934, the accelerator signals completion of the processing task and, at 936, either waits for a new job to arrive or begins processing of the next job in its job queue. At 938, the address translation hardware is reconfigured to map the virtual addresses of the input and output buffers to the physical addresses of the input and output buffers allocated to the process. This may be done, for example, by using remap registers for specific virtual address ranges (e.g., that are page-aligned) that provide starting addresses or offsets for the new physical memory ranges. When the remapping is complete, as indicated by 940, the accelerator processing task is complete and the host processor can continue normal operation at 942. When a new virtual address to physical address mapping is desired, the host processor writes a new physical offset to this register.

Figure 10:
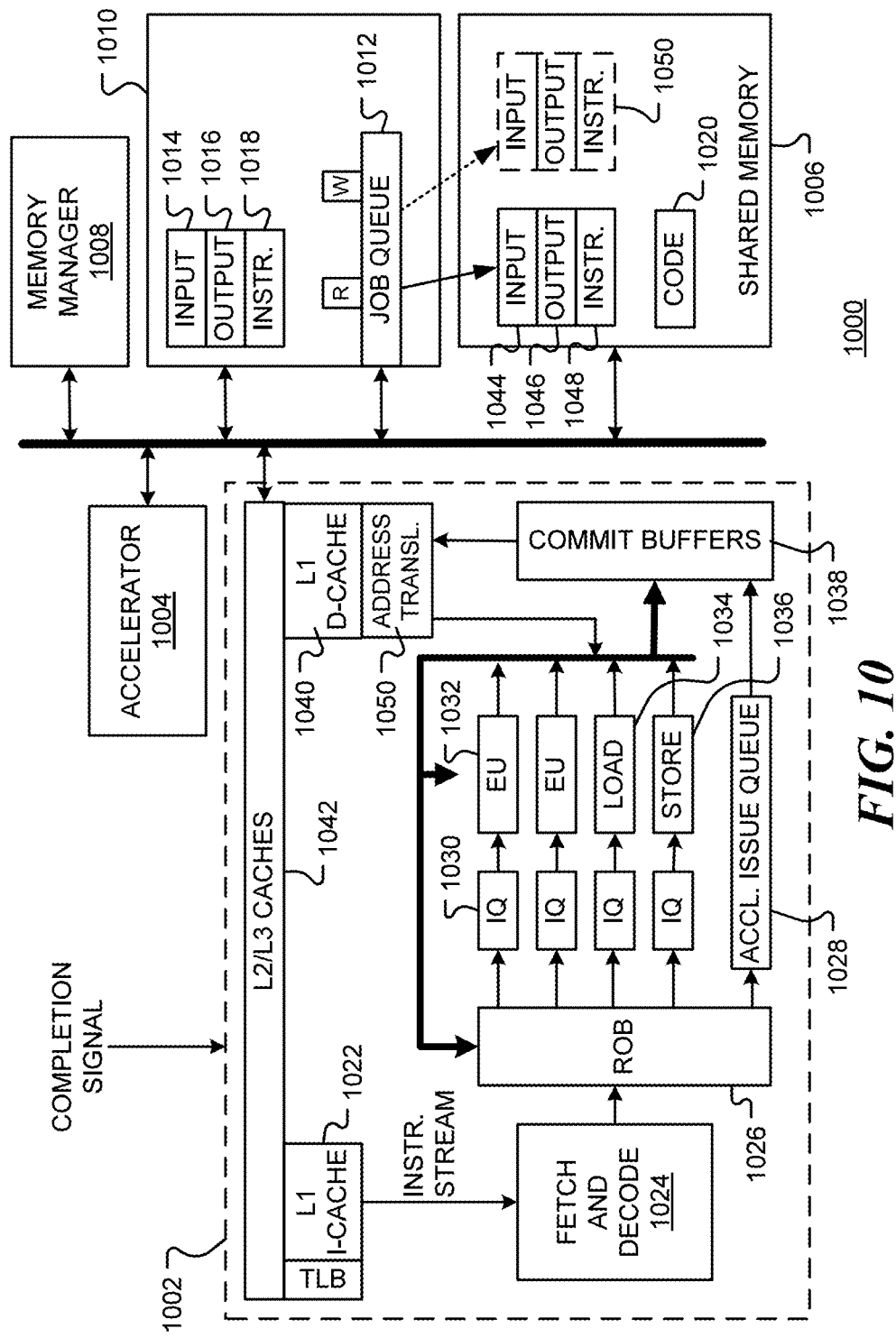
FIG. 10 is a block diagram of an example data processing system in accordance with various representative embodiments.

FIG. 10 is a block diagram of an example data processing system 1000 in accordance with an embodiment of the disclosure. Data processing system 1000 includes at least one host processor 1002, at least one accelerator 1004, shared memory 1006 and a memory manager 1008. Additional memory 1010, used by accelerator 1004 may be a region of the shared memory, memory internal to the accelerator, or a combination thereof. In one embodiment, accelerator job queue 1012 is internal to the accelerator and is memory-mapped to the physical address space. Read (R) and write (W) pointers to the queue are maintained by the accelerator and jobs are processed in order. If job queue 1012 is in the shared memory, the read and write pointers may be maintained in software.

The block denoted as memory manager 1008 performs memory allocation and mapping functions. These include functions of the operating system, an accelerator device driver and a memory management unit. A firmware interface table (or other boot interface) is read when host processor 1002 is booted. The table is used to set physical memory addresses for the accelerator job queue 1012, an accelerator input buffer 1014, an accelerator output buffer 1016, and an accelerator instruction queue 1018. These buffers may be in the shared memory.

When an application or process that uses accelerator starts, a device driver or OS (denoted by memory manager 1008) maps physical memory addresses to virtual addresses unique to the process. In particular, the accelerator job queue is mapped to a virtual address in the virtual address region of the process. Code 1020 is moved into shared memory 1006 and then into level 1 (L1) instruction cache (I-cache) 1022 of host processor 1002. The instructions are fetched from the instruction cache and decoded by fetch and decode unit 1024. In the embodiment shown, instructions are stored in reorder buffer (ROB) 1026 until data dependencies have been resolved. This enables some instructions to be executed out of order. When dependencies have been resolved, instructions are passed to the instruction queue 1030 of the appropriate execution unit (EU) 1032, load unit 1034, or store unit 1036. Execution results are passed back the execution units and/or to reorder buffer 1026. Finally, results may be committed to memory via commit buffers 1038. Results may be passed back through L1 data cache 1040 and lower-level caches 1042.

Before the process off-loads a job to the accelerator, input buffer 1044 and output buffer 1046 are allocated in the virtual address space of the process and assigned physical memory. Optionally, instruction buffer 1048 may also be allocated for pre-loading accelerator instructions. Alternatively, instructions may be sent from the core via connected wires rather than via an instruction buffer in memory. In an example implementation, the size of the buffers is determined at runtime, with the maximum size of a buffer defined through a firmware interface table. On-accelerator buffers could also be partitioned amongst multiple processes or accelerator jobs.

Prior to an accelerator START instruction being decoded, data may be pre-loaded into input buffer 1044 of the process.

When an accelerator START instruction is decoded, configuration data is sent to accelerator job queue 1012. This may be done via a push to the job queue, using a conditional block store instruction that performs an atomic write of a block of data conditional on the endpoint accepting the data. If the push to the job queue fails, a push to the job queue of another suitable accelerator may be attempted, or the accelerator instructions may be executed on the host processor.

When the accelerator picks up the job from the accelerator job queue, the configuration data in the queue, or referenced in the queue is read. In one implementation, the configuration data includes addresses for the input, output, and instruction buffer of the process, the PASID, the CPUID, etc. The state of the accelerator is reset, and the accelerator copies input data from process input buffer 1044 to accelerator input buffer 1014. Optionally, instructions in instruction buffer 1048 are copied to accelerator instruction buffer 1018. The accelerator then signals the host processor that setup is complete and that the accelerator is ready to receive instructions.

Accelerator instructions may be identified in fetch and decode unit 1024 by a designated bit in the instruction or by the presence of START and STOP instructions, or by other means. When instructions for the accelerator hit the decode unit on the host core, instructions are bundled in the reorder buffer (ROB) 1026 (or equivalent structure) until dependencies are resolved and the instructions themselves can be issued non-speculatively. Once dependencies are resolved, instructions are issued into accelerator issue queue 1028. In one embodiment, accelerator issue queue 1028 is connected directly to the commit buffers 1034 of the host processor and the instructions get streamed to the memory mapped-location of the accelerator instruction queue 1018. Only the final accelerator instruction to store data to the accelerator output buffer address is kept in reorder buffer (ROB) 1026 (or equivalent structure). The output buffer address is stored in the reorder buffer (or equivalent structure), while other instructions can be put into an issue queue 1030 and be forgotten by reorder buffer, as they do not have accelerator dependencies.

When an instruction executed on the host processor and referencing virtual address X is executed on the host processor, it is issued to an instruction queue 1030 of the host processor and by a load unit 1034 or store unit 1036 of the host processor. The execution includes translating, in translation hardware 1050 of the host processor, the virtual address to a first physical address. However, when an instruction referencing the same virtual address is to be executed on the accelerator device, the virtual address is first translated to a second physical address by translation hardware 1050. The instruction, referencing the second physical address is then sent to the accelerator device.

As discussed above, the address translation may be performed, for example, by executing a pseudo-load instruction on the host processor for the virtual address. This loads the corresponding physical address into a register in reorder buffer 1026. The physical address value is then referenced in the instruction sent to the accelerator.

For a designated range of addresses, address translation by translation hardware 1050 may include adding an address offset value from a remap register to determine the physical address. The value in the remap register is set, by the host processor, dependent upon whether instructions are being executed on the host processor or on an accelerator. Different values may be used for different accelerators.

On an accelerator store instruction to the accelerator output buffer 1016, a pseudo-store instruction is issued from the host core followed by a load from the accelerator output data buffer, as instantiated by the host process. The pseudo-store is used for translation purposes on the host core.

When an accelerator STOP instruction is decoded, the instruction is passed to the accelerator as described above. When the accelerator encounters the STOP instruction, the accelerator alerts the host processor core that the accelerator has completed execution. The alert may be issued as an event, an interrupt, or equivalent. Once alerted, the host processor can use data from output buffer.

Multiple host processors (or processes) may use the accelerator by writing to accelerator job queue 1012. Thus, another entry in the queue may reference input, output and instruction buffers 1050 of a second host processor.

In this document, relational terms such as first and second, top and bottom, and the like, may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method comprising:
executing a program of instructions for a process in a data processing apparatus, the program of instructions including host instructions for execution on a host processor of the data processing apparatus and a block of one or more accelerator instructions for a processing task executable on the host processor or an accelerator device of the data processing apparatus;
for an instruction executed on the host processor and referencing a first virtual address of the process:
issuing the instruction to an instruction queue of the host processor, the instruction referencing the first virtual address; and
executing the instruction by the host processor, said executing including translating, by translation hardware of the host processor, the first virtual address to a first physical address; and for an instruction executed on the accelerator device and referencing the first virtual address of the process:
translating, by translation hardware of the host processor, the first virtual address to a second physical address; and
sending the instruction to the accelerator device, the instruction referencing the second physical address.

2. The method of claim 1, where:
said translating the first virtual address to a first physical address uses a first address mapping, and
said translating the first virtual address to the second physical address uses a second address mapping.

3. The method of claim 1, where said translating the first virtual address to the second physical address includes executing a pseudo-load operation by the host processor referencing the first virtual address.

4. The method of claim 1, further comprising:
mapping a job queue of the accelerator device to a job queue address in a physical address space of the data processing apparatus;
initiating the process on the host processor, said initiating including:
loading the program of instructions into a memory of the data processing apparatus for execution on the host processor; and
mapping a job queue virtual address in a virtual address space of the process to the job queue address;
storing, by the host processor, configuration data for the data processing task to the job queue of the accelerator using the job queue virtual address;
at the accelerator device:
reading the configuration data from the job queue;
determining, based on the configuration data, physical memory addresses, in the memory, of input and output buffers allocated to the process;
copying input data in the input buffer allocated the process to an input buffer of the accelerator device; and
signaling the host processor that accelerator device is ready to receive accelerator instructions from the host processor.

5. The method of claim 4, where said mapping the job queue of an accelerator device to the job queue address in the physical address space is performed when the data processing apparatus is booted.

6. The method of claim 4, where said initiating the process is performed by an operating system and includes mapping the job queue address associated with the job queue of the accelerator device to the job queue virtual address.

7. The method of claim 4, further comprising at the accelerator device:
executing the accelerator instructions received from the host processor to process data stored in the input buffer of the accelerator device to produce output data and store the output data in an output buffer of the accelerator device;
upon completion of the processing task, copying the output data to the output buffer allocated to the process using the address of the output buffer allocated to the process; and
signaling the host processor that processing task is complete.

8. The method of claim 7, further comprising at the host processor:
determining if the processing task is completed;
issuing a load instruction to load output data processed in the processing task from a output virtual address in an output buffer;
if the processing task is completed:
translating, by the translation hardware of the host processor, the output virtual address to a physical address in the memory in an output buffer allocated to the process; and
executing the load instruction referencing the physical address in the output buffer allocated to the process; and
if the processing task is not completed:
translating, by the translation hardware of the host processor, the output virtual address to a physical address in the output buffer of the accelerator device; and
executing the load instruction referencing the physical address in the output buffer of the accelerator device.

9. The method of claim 7, where said copying the output data to the output buffer allocated to the process is performed in response to the host processor signaling the accelerator in response to the host processor fetching and decoding a final instruction of the block of accelerator instructions.

10. The method of claim 4, where said storing configuration data for the data processing task to the job queue of the accelerator using the job queue virtual address is performed in response to the host processor fetching and decoding an initial instruction of the block of accelerator instructions.

11. The method of claim 4, further comprising:
initiating a second process, on the host processor or a further host processor, of the data processing apparatus;
mapping a further job queue virtual address in a virtual address space of the second process to the job queue address; and
storing, by the second process, configuration data for a second data processing task to the job queue of the accelerator using the job queue virtual address in the virtual address space of the second process.

12. The method of claim 4, further comprising, when said storing the configuration data for the data processing task to the job queue of the accelerator using is unsuccessful:
executing the accelerator instructions to process the input data stored in the input buffer of the host processor to produce output data and store the output data in the output buffer of the host processor.

13. The method of claim 4, where the configuration data includes data identifying:
a starting physical address and a size of the input buffer in the memory; and
a starting physical address and a size of the output buffer in the memory.

14. The method of claim 1, further comprising at the host processor:
determining if the block of accelerator instructions is to be executed on the host processor or the accelerator device;
issuing a store instruction, in the block of accelerator instructions, to store input data to be processed in the processing task to an input virtual address in an input buffer;
for accelerator instructions executed on the host processor:

translating, by the translation hardware of the host processor, the input virtual address to a physical address in the memory in an input buffer allocated to the process; and executing the store instruction referencing the physical address in the input buffer allocated to the process; and for accelerator instructions executed on the accelerator device:

translating, by the translation hardware of the host processor, the input virtual address to a physical address of an input buffer of the accelerator device; and executing the store instruction referencing the physical address in the input buffer of the accelerator device.

15. The method of claim 1, where said sending the instruction to the accelerator device includes:

translating, by the translation hardware of the host processor, an instruction buffer virtual address to a physical address; and writing an accelerator instruction to the physical address.

16. The method of claim 1, where said sending the accelerator instructions to the accelerator device includes sending the accelerator instructions to the accelerator device over a dedicated communication channel.

17. A data processing apparatus comprising:

an accelerator operatively coupled to a memory;

a first host processor, operatively coupled to the memory, including:

an instruction decoder configured to receive and decode a stream of computer instructions of a process and identify, therein, accelerator instructions of a block of one or more accelerator instructions for an accelerator task;

an instruction buffer configured to hold an accelerator instruction until data dependencies of the accelerator instruction are resolved and then issue the accelerator instruction to a first instruction path, from the instruction buffer to execution units of the first host processor, or to a second instruction path from the instruction buffer to the accelerator;

address translation hardware configured to translate virtual addresses of the process using a first address map that maps first virtual addresses to first physical addresses, in the memory, allocated to the process and a second address map that maps the first virtual addresses to second physical addresses of the accelerator, the first virtual addresses including an input buffer virtual address and an output buffer virtual address;

where the data processing apparatus is configured to:

select the first instruction path or the second instruction path for the block of one or more accelerator instructions based on requirements of the block of accelerator instructions;

process an accelerator instruction selected for the first instruction path, including:

issue the accelerator instruction to the first instruction path, the accelerator instruction referencing a virtual address of the process, translate, by the address translation hardware, the virtual address to a first physical address using the first address map, and execute, by the first host processor, the accelerator instruction referencing the first physical address; and process an accelerator instruction selected for the second instruction path, including:

translate, by the address translation hardware, a virtual address referenced by the accelerator instruction to a second physical address using the second address map, and send the accelerator instruction to the accelerator, the accelerator instruction referencing the second physical address.

18. The data processing apparatus of claim 17, further comprising:

task off-load circuitry configured to:

request access to the accelerator at the start of an accelerator task;

responsive to acknowledgement of access to the accelerator, signal the address translation hardware to use the second address map;

write input data for the accelerator task to an input buffer of the accelerator using the input buffer virtual address;

send accelerator instructions to the accelerator via the second instruction path;

signal the accelerator when all instructions of the block of accelerator instructions have been sent to the accelerator; and responsive to acknowledgement of completion of the accelerator task by the accelerator, signal the address translation hardware to use the first address map.

19. The data processing apparatus of claim 18, where:

said request access to the accelerator at the start of the accelerator task includes:

write configuration data for the accelerator task to a memory-mapped accelerator job queue, the configuration data including data identifying an input buffer, an instruction buffer and an output buffer in the memory; and the accelerator is configured to:

read the configuration data from the accelerator job queue;

determine, based on the configuration data, physical addresses in the memory of the input buffer and the output buffer;

copy any input data in the input buffer of the memory to the input buffer of the accelerator; and signal the first host processor that accelerator is ready to receive accelerator instructions from the first host processor.

20. The data processing apparatus of claim 19, where the accelerator is configured to:

execute the accelerator instructions, received from the first host processor, to process data in the input buffer of the accelerator and produce output data in the output buffer of the accelerator; and responsive to the signal from the first host processor that all instructions of the block of accelerator instructions have been sent to the accelerator:

copy the output data from the output buffer of accelerator to the output buffer in the memory, using the configuration data; and signal the first host processor when the output data is copied.

21. The data processing apparatus of a claim 19, further comprising:

a second host processor operatively coupled to the memory and configured to request access to the accelerator at the start of an accelerator task by writing configuration data for a second accelerator task to the memory-mapped accelerator job queue, where the accelerator is further configured to execute accelerator tasks requested in the accelerator job queue in a designated order.

22. The data processing apparatus of claim 17, where the instruction buffer of the first host processor includes a re-order buffer and the first host processor is configured to process instructions, other than accelerator instructions, of the stream of computer instructions, in parallel with the accelerator processing accelerator instructions.

23. The data processing apparatus of claim 17, where the address translation hardware includes a remap register accessible by the host processor.

* * * * *